June 2, 1970  C. B. SWILLING  3,515,425
LINE DRAG
Filed Dec. 26, 1967
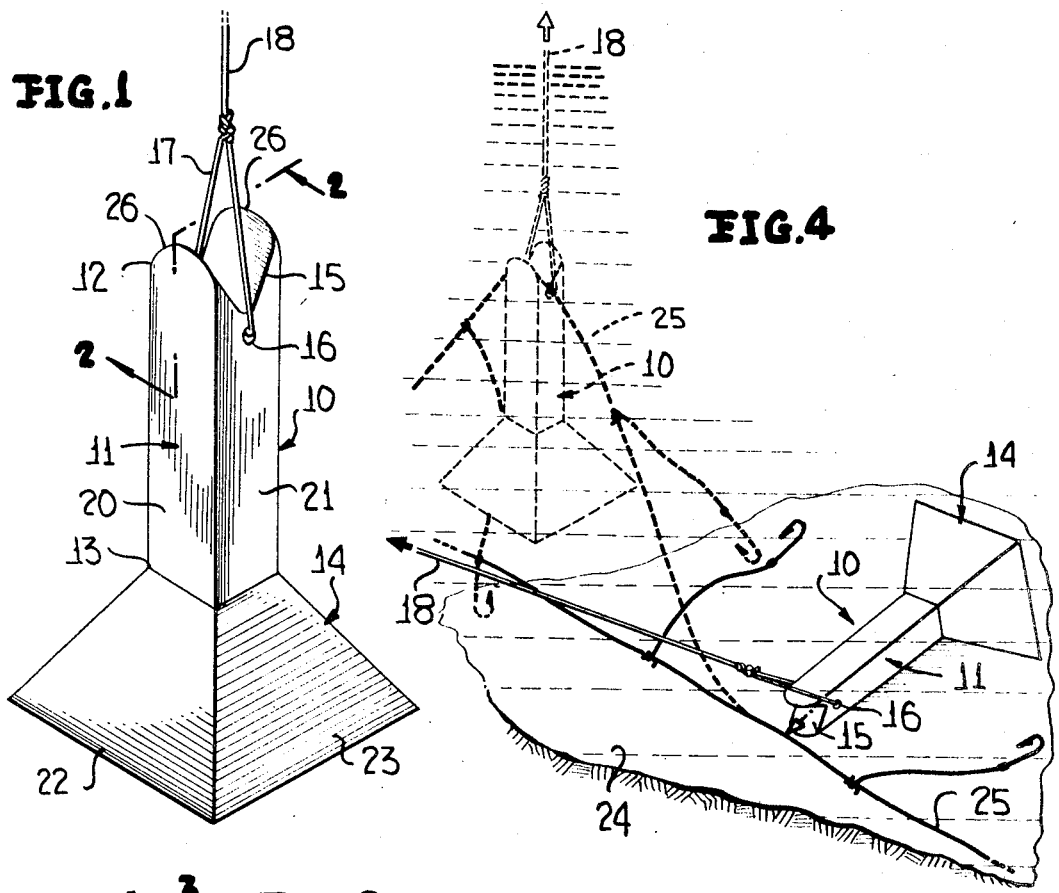
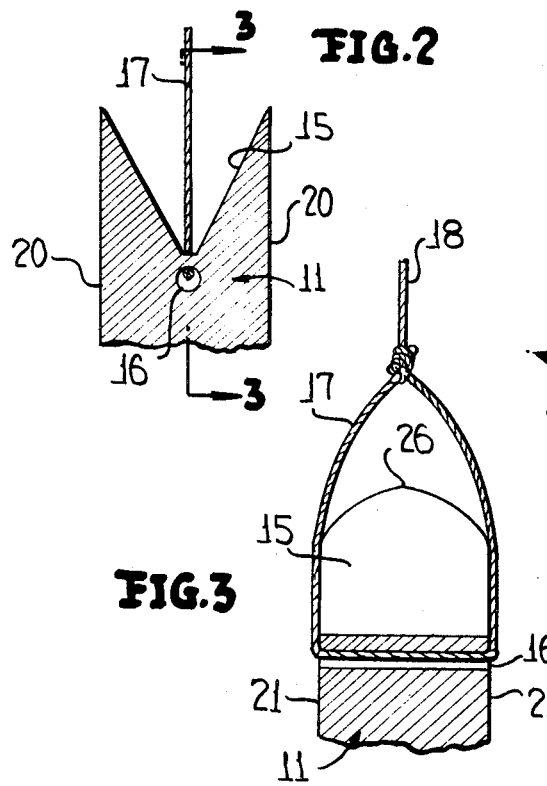
INVENTOR
CARL B. SWILLING
BY
ATTORNEY

3,515,425
LINE DRAG
Carl B. Swilling, Rte. 2, Box 120,
Madill, Okla. 73446
Filed Dec. 26, 1967, Ser. No. 693,385
Int. Cl. B66c 1/00
U.S. Cl. 294—66                             5 Claims

ABSTRACT OF THE DISCLOSURE

This disclosure has to do with a line drag which is particularly constructed so as to suddenly pick up lines which lie on or close to the bottom of a body of water and at the same time will not become entangled in brush and other undesirable foreign matter which may be lying on the bottom. The line drag is constructed whereby the leading end thereof, which is provided with article engaging means, will always ride along the bottom. On the other hand, the line drag is of a construction wherein once the leading end thereof becomes engaged with an immovable object, such as brush, it will pivot end for end upon itself and become automatically disengaged from such foreign matter.

---

This invention relates in general to new and useful improvements in drags, and more particularly to a line drag of the anti-fouling type.

In the past many types of drags have been devised. However, while such drags have been of constructions which will assure the engagement with articles lying on the bottom of a body of water, the construction of the drags is also such that the drags oftentimes become entangled with relatively immovable objects, such as brush, etc. with the result that much time is lost disengaging the drag and in many instances even the drag is lost.

In accordance with this invention, it is proposed to provide a line drag which is of a construction wherein, when dragged under water, will have the forward end thereof riding on the bottom so as to assure the engagement of a line or other element to be engaged whereby the line drag has the desired efficiency.

Another object of this invention is to provide a line drag, which, although it is constructed to closely follow the contour of the bottom of a body of water, when engaged with a relatively immovable object, will automatically shift its position when a sufficient pull is exerted thereon so as to become disengaged from such foreign object.

A further object of this invention is to provide a novel line drag which is of an extremely simple construction and which may be readily formed in an inexpensive manner so as to be economically feasible.

With the above and other objects in view that will hereinafter appear, the nature of the invention will be more clearly understood by reference to the following detailed description, the appended claims and the several views illustrated in the accompanying drawings.

In the drawings:

FIG. 1 is perspective view of the line drag showing the same suspended from a line.

FIG. 2 is an enlarged fragmentary longitudinal sectional view taken along the line 2—2 of FIG. 1 and shows specifically the details of the article engaging means at the leading end thereof and the relationship of attaching means with respect to the article engaging means.

FIG. 3 is an enlarged fragmentary longitudinal sectional view taken along the line 3—3 of FIG. 2 and shows further the details of the body of the line drag at the leading end thereof.

FIG. 4 is a schematic perspective view showing in solid lines how the line drag will engage a trot line and in phantom line how the trot line may be lifted utilizing the line drag.

FIG. 5 is a schematic perspective view showing in solid lines the line drag engaged with brush lying on the bottom and in phantom lines the manner in which the line drag automatically disengages itself from the brush.

Referring now to the drawings in detail, it will be seen that there is illustrated the line drag which is the subject of this invention, the lined drag being generally referred to by the numeral 10. The line drag 10 includes an elongated body 11 which includes a leading end 12 and a trailing end 13. At the trailing end 13, the body 11 is provided with an enlargement 14 which constitutes positioning means to assure the positioning of the leading end 12 of the body in engagement with the bottom of the body of water at all times.

At the leading end 12 of the body 11, the body 11 is provided with a notch 15 of a generally V-shaped cross section, which notch 15 opens forwardly and is in the form of article engaging means. It is to be noted that the notch 15 has an axis extending transversely of the body 11.

The body 11 is provided adjacent the notch 15 with a transverse bore 16. The bore 16 has an axis which is parallel to the transverse axis of the notch 15 and is disposed closely adjacent the bottom of the notch 15. It is to be noted that the transverse bore 16 functions as attaching means for securing a line to the line drag 10 and has passed therethrough a loop 17 of a line 18 which is utilized both in the casting of the line drag 10 and the towing end thereof.

It is to be noted that the body 11 is of a rectangular cross section and includes a pair of opposite sides 20 and 21. The sides 20, which are disposed parallel to the axis of the bore 15, must be flat for a purpose to be described in more detail hereinafter.

It is not necessary that the sides 21 be flat, but for ease of construction and economy of material, they normally will also be flat.

The enlargement 14 is generally pyramidal in outline and is oriented in alignment with the body 11. The enlargement 14 has two opposite pairs of sides 22 and 23 which are generally aligned with the sides 20 and 21 of the body 11. At least the sides 22 should be flat, although it is preferred that the sides 23 also be flat for economy of material.

It will be readily apparent that when the line drag 10 is thrown into the water and lands upon the bottom therof, such as the bottom 24 in FIGS. 4 and 5, it will come to rest lying either on the sides 20, 22 or the sides 21, 23. When the line drag 10 comes to rest lying on the sides 20, 22, this is the correct position. On the other hand, when it comes to rest on the sides 21, 23, notch 15 cannot function to engage an article, such a line, lying on the bottom 24. However, because the axis of the bore 16 is disposed parallel to the sides 20, 22, it will be readily apparent that when a pull is exerted on the line 18, the line drag 10 will automatically turn over and come to rest on the sides 20, 22 in position for engaging an article lying on the bottom 24.

It will be readily apparent from FIGS. 4 and 5 that the configuration of the line drag 10 is such that when the line drag 10 is lying on the bottom 24, it will be in engagement with the bottom primarily at the leading end only of the body 10 and at the extreme trailing end of the enlargement 14. The line drag 10 will thus assume an arched relation with respect to the bottom 24 and will assume a position wherein the leading end 12 thereof will have a tendency to dig slightly into the bottom to assure that it will pick up anything lying on the bottom.

In order to enhance the picking up of relatively fine items, such as a trot line 25 shown in FIG. 4, the ends of the sides 20 of the body 11 are rounded as at 26.

It will be readily apparent from FIG. 4 that the line drag 10 may be conveniently used for the purpose of picking up trot lines. When the general location of the trot line 25 is known, it is merely necessary to throw the line drag 10 to one side thereof and pull the line drag towards oneself. The line drag 10 will engage the trot line 25 and when it approaches the person pulling on the line 18, the leading end 12 of the body 11 will lift up first retaining its engagement with the trot line 25 and serving to lift the trot line, as is shown in phantom lines in FIG. 4.

Reference is now made to FIG. 5 wherein the line drag 10 is illustrated in full lines engaged with an immovable object, such as brush 27. While the brush 27 may become engaged within the notch 15 and momentarily the line drag 10 is anchored relative thereto, due to the fact that the angle of the line 18 extending from the line drag 10 always extends above the brush 27 and since the axis of the bore 16 will be beyond the brush 27, the line drag 10 will pivot about the brush 27, as is shown in phantom lines in FIG. 5, and automatically become disengaged therefrom.

It will be readily apparent that the line drag 10 is of a configuration wherein it may be economically molded. At the same time, the configuration is such that it will function in the desired manner to pick up lines and other similar objects lying on the bottom. In addition to these beneficial results, it will be readily apparent that the line drag 10 is of the anti-fouling type and therefore, will perform satisfactory on bottoms having large quantities of foreign matter.

Although only a preferred embodiment of the line drag has been specifically illustrated and described herein, it is to be understood that minor variations may be made in the line drag construction without departing from the spirit and scope of the invention, as defined in the appended claims.

I claim:

1. An anti-fouling line drag particularly adapted for picking up lines and like members lying on the bottom of a body of water, said line drag comprising an elongated body having a leading end and a trailing end, said body having article engaging means at said leading end, positioning means at said trailing end for retaining said leading end in a bottom engaging position, and attaching means for securing a line to said body, said article engaging means being in the form of a shallow transverse notch in the leading end of said body, said notch having a dimension longitudinally of said body which is only a small part of the overall length thereof, said attaching means being in the form of a transverse bore through said body, said bore being disposed immediately adjacent said notch and being disposed materially in advance of the longitudinal center of said body and substantially adjacent the leading end of said body, said bore being adapted to receive a loop of a drag line to form a freely pivoting connection between said line drag and a drag line whereby when an immovable object is engaged in said notch said line drag will pivot end for end about such object and be automatically released.

2. The line drag of claim 1 wherein said positioning means is in the form of a generally abrupt enlargement to thereby provide for an arched relation between said line drag and a supporting bottom with said leading end remaining engaged with such supporting bottom to assure the pick-up of a small object lying on the supporting bottom by said notch.

3. The line drag of claim 1 wherein said positioning means is in the form of a generally abrupt enlargement to thereby provide for an arched relation between said line drag and a supporting bottom with said leading end remaining engaged with such supporting bottom to assure the pick-up of a small object lying on the supporting bottom by said notch, and a flat surface on said body and said enlargement on at least one side of said line drag and parallel to the axis of said notch.

4. The line drag of claim 1 wherein said positioning means is in the form of a generally abrupt enlargement to thereby provide for an arched relation between said line drag and a supporting bottom with said leading end remaining engaged with such supporting bottom to assure the pick-up of a small object lying on the supporting bottom by said notch, a flat surface on said body and said enlargement on at least one side of said line drag and parallel to the axis of said notch, and the axis of said bore being parallel to the axis of said notch.

5. The line drag of claim 1 wherein said positioning means is in the form of a generally abrupt enlargement to thereby provide for an arched relation between said line drag and a supporting bottom with said leading end remaining engaged with such supporting bottom to assure the pick-up of a small object lying on the supporting bottom by said notch, said body and said enlargement each being rectangular in transverse section with said enlargement and said body being of like orientation and said enlargement flaring from its connection with said body.

References Cited

UNITED STATES PATENTS 110,329   12/1910   Allen _____ 294—66

FOREIGN PATENTS 2,121   7/1969   Great Britain.

ANDRES H. NIELSEN, Primary Examiner